(No Model.)

F. SANDVOS.
BELT COUPLING.

No. 320,592. Patented June 23, 1885.

WITNESSES
Jos. H. Rosenbaum.
Ernst Wolff.

INVENTOR
Frederick Sandvos
By his Attorney

UNITED STATES PATENT OFFICE.

FREDERICK SANDVOS, OF NEW YORK, N. Y.

BELT-COUPLING.

SPECIFICATION forming part of Letters Patent No. 320,592, dated June 23, 1885.

Application filed April 24, 1885. (No model.)

*To all whom it may concern:*

Be it known that I, FREDERICK SANDVOS, of the city, county, and State of New York, have invented certain new and useful Improvements in Belt-Couplings, of which the following is a specification.

This invention has reference to an improved coupling for belts, by which the latter pass readily around the pulleys without beating thereon; and the invention consists of a belt-coupling formed of two hinged leaves which are provided at the upper side with raised portions, and screw-holes for the fastening-screws, and at the bottom with projecting spurs that take into the leather of the belt. The hinge of the leaves is made of sleeves having stops that extend alternately in opposite direction over the leaves, and of a pintle that is retained in position by stop-screws screwed into the end sleeves of the hinge.

Figure 1:
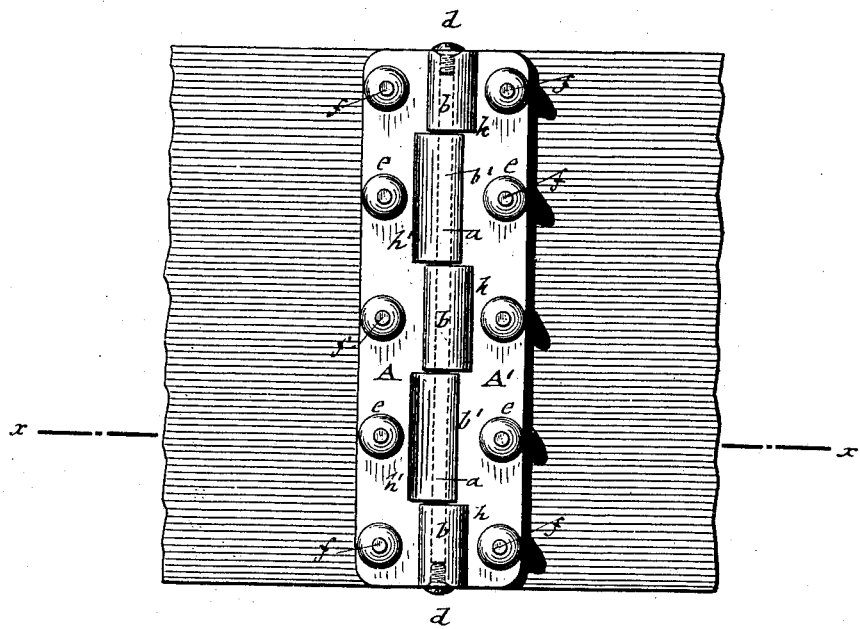
Figure 2:
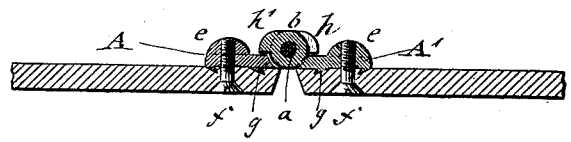

In the accompanying drawings, Figure 1 represents a top-view, and Fig. 2 a vertical transverse section on line $x \, x$, Fig. 1, of my improved belt-coupling.

Similar letters of reference indicate corresponding parts.

A A' in the drawings represent the leaves of my improved belt-couplings, which leaves are united by a hinge-joint that consists of a pintle, $a$, which is passed through the sleeves $b \, b'$ of the leaves A A' and held in position by stop-screws $d \, d$, that are screwed into the end sleeves of the leaf A. The leaves A A' are provided at their upper side with raised portions $e$, having threaded perforations for the countersunk screws $f f$ by which the ends of the belt are applied to the leaves of the coupling. The under sides of the leaves A A, are provided with projecting spurs $g$, that are inclined in opposite direction to the tension exerted by the belt on the leaves, as shown in Fig. 2, so that the belt is intimately united to the leaves. The sleeves $b \, b'$ of the leaves A A' are provided alternately with stop-shoulders $h \, h'$, which project laterally over the leaves, and serve to hold the leaves in line with the belt after the same has passed over the pulley, so as to prevent thereby the inward springing of the leaves by the tension of the pulley.

When the coupling passes around the pulley the leaves adjust themselves by their hinge-connection to the shape of the pulley, for which purpose the inner adjoining ends of the belt are separated to some extent and beveled, so as to permit the required play of the hinge in passing around the pulley.

For larger sizes of belts, two or more couplings may be used sideways of each other, in which case one pintle may pass through the sleeves of the different couplings, said pintle being bent to correspond to the curvature of the rim of the pulley and returned by the stop-screws of the outer end sleeves.

Having thus described my invention, I claim as new, and desire to secure by Letters Patent—

1. A belt-coupling consisting of hinged leaves having sleeves with stop-shoulders that extend alternately in opposite directions over the leaves, and screws for fastening the ends of the belt to the leaves, substantially as set forth.

2. The combination, in a belt-coupling, of the hinged leaves A A', having sleeves $b \, b'$, provided with shoulders $h \, h'$, extending alternately in opposite directions, countersunk screws for attaching the belt ends to the leaves, a pintle passing through said sleeves, and stop-screws screwed into the end sleeves, substantially as set forth.

In testimony that I claim the foregoing as my invention I have signed my name in presence of two subscribing witnesses.

FRED. SANDVOS.

Witnesses:
 PAUL GOEPEL,
 SIDNEY MANN.